United States Patent
Hou

(10) Patent No.: US 8,554,426 B2
(45) Date of Patent: *Oct. 8, 2013

(54) AUTOMATIC PRODUCTIVITY MANAGEMENT CONTROL WITH STANDARD POWER SHIFT TRANSMISSION

(75) Inventor: Yanming Hou, Pleasant Prairie, WI (US)

(73) Assignee: CNH America LLC, New Holland, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/349,458

(22) Filed: Jan. 12, 2012

(65) Prior Publication Data

US 2012/0179341 A1      Jul. 12, 2012

Related U.S. Application Data

(63) Continuation of application No. 12/329,976, filed on Dec. 8, 2008, now Pat. No. 8,121,763.

(51) Int. Cl.
G06F 19/00    (2011.01)

(52) U.S. Cl.
USPC .......................................................... 701/51

(58) Field of Classification Search
USPC .......... 701/50, 51, 52, 54; 477/107, 108, 109, 477/110
See application file for complete search history.

(56) References Cited

U.S. PATENT DOCUMENTS

| | | | |
|---|---|---|---|
| 6,553,302 B2 * | 4/2003 | Goodnight et al. | 701/54 |
| 6,865,870 B2 * | 3/2005 | Heisey | 56/10.2 G |
| 8,121,763 B2 * | 2/2012 | Hou | 701/51 |

* cited by examiner

Primary Examiner — Kim T Nguyen
(74) Attorney, Agent, or Firm — Sue C. Watson

(57) ABSTRACT

An engine-powered vehicle having an automatic power management feature is provided. It includes an engine, a transmission with multiple gear ratios driven by the engine, a final drive which provides axle torque data to the transmission to establish engine torque, and an electronic controller for controlling both the engine and the transmission. The electronic controller has automatic speed control, and it also has a device to input data, receive data, and to evaluate at least one variable during automatic speed control. When the electronic controller receives data input from the engine, transmission, final drive, and device, the electronic controller determines engine rpm and transmission gear as a result of the data received to maintain a selected speed.

36 Claims, 1 Drawing Sheet

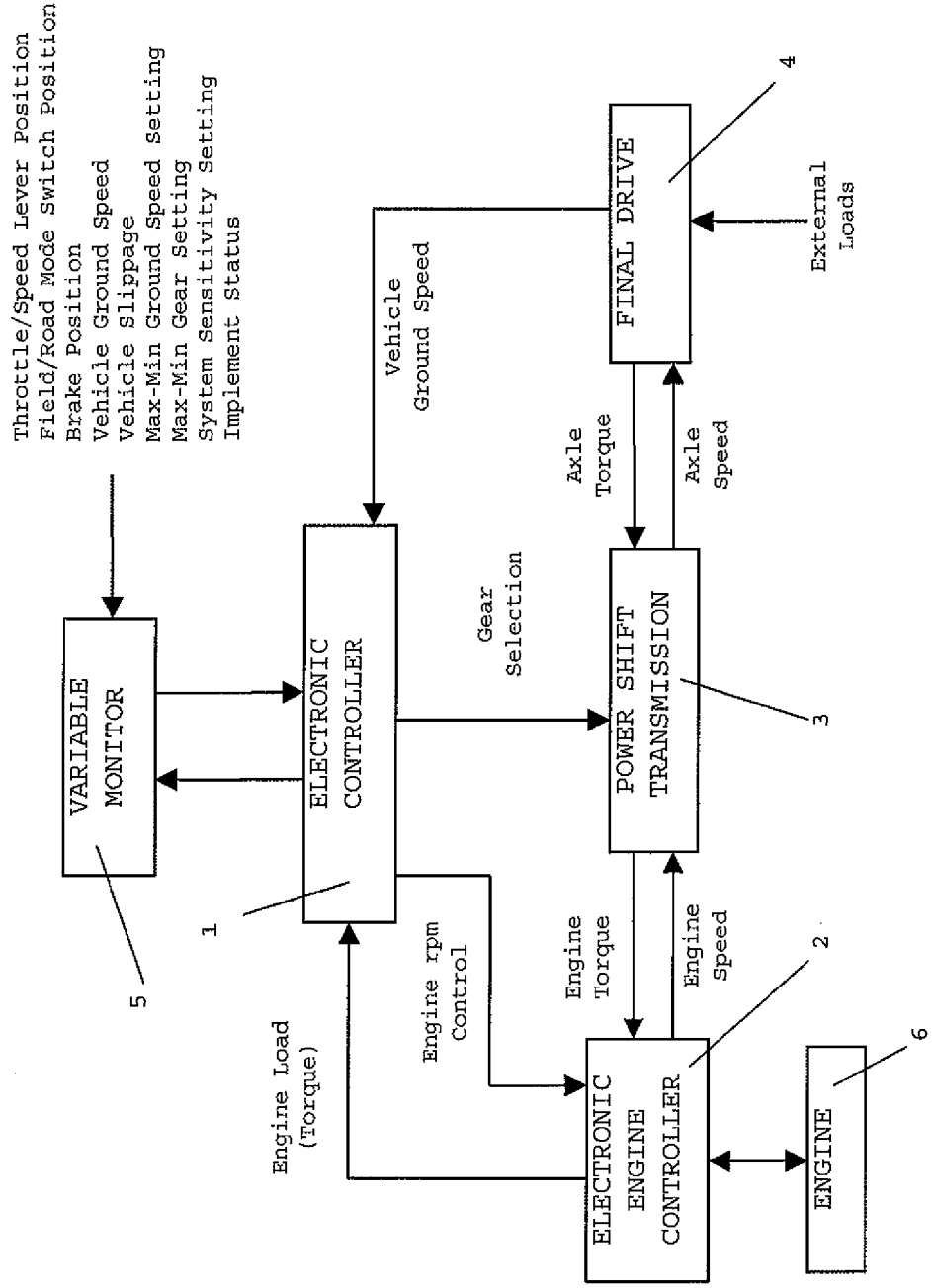

AUTOMATIC PRODUCTIVITY MANAGEMENT CONTROL WITH STANDARD POWER SHIFT TRANSMISSION

CROSS REFERENCE TO REALTED APPLICATIONS

The present application is a continuation of U.S. patent application Ser. No. 12/329,976 filed Dec. 8, 2008, by Yanming Hou, entitled "Automatic Productivity Control With Standard Power Shift Transmission", which is incorporated by reference herein for all purposes in its entirety.

BACKGROUND

1. Field of the Invention

The present invention generally relates to a vehicle, including work vehicles such as an agricultural tractor, having a multiple gear ratio transmission and an operator actuated selector switch for selecting between manual or automatic speed control modes wherein the transmission is a variable transmission or has a finite number of gear ratios, and wherein in the automatic mode, an electronic controller automatically up-shifts the transmission and reduce the engine speed to maintain the desired vehicle speed and reduce fuel consumption when the load is reduced and automatically down-shifts the transmission and increase the engine speed when the load is increased. The present invention relates more specifically to such a vehicle having an automatic power management system, wherein the vehicle includes a device for determining a variable during automatic speed control mode to control the engine rpm and the transmission gear during automatic speed control mode, in which the variable is (a) the position of a selector switch, which is positionable in a field mode for operating the vehicle in a field, including tillage applications under changing load conditions, and a road mode for operating the vehicle during road hauling or transportation, (b) the position of a brake and ground speed, (c) vehicle slippage and ground speed, (d) an operator set maximum and minimum ground speed, (e) an operator set maximum and minimum gear setting, (f) system sensitivity, and/or (g) change in implement status.

2. Description of Related Art

The engine and transmission are the two primary components in the power train of a vehicle. The vehicle speed is determined mainly by the set engine speed (engine rpm or erpm) and set transmission gear and partially by the vehicle load. In manual speed control mode, the erpm is typically set by the erpm throttle lever. The gears are typically set by up/down-shift buttons. Power shift transmissions have fixed input/output ratios for each gear setting. To maintain a desired ground speed, the operator needs to adjust both the gear setting and the throttle lever position.

The drawbacks of manual vehicle ground speed control include it being impossible for the operator to detect and follow engine load constantly. Therefore, the vehicle will run with a preset erpm, which most often is different than the most efficient working point. Also, the operator has to set both erpm and gear to reach the desired vehicle ground speed, which can be arduous in some cases, such as during headland operation, during which the farm implements are turned around at the end of the field and multiple operations of implements are conducted at the same time.

Further, vehicle speed depends on the gear setting. Gear setting changes will cause the speed range to change. With a fixed erpm, such a gear shift or range change will cause a relatively high ground speed change.

SUMMARY

In one embodiment of the present invention, an engine-powered vehicle has an automatic power management feature including an engine having a rated engine speed, a transmission having multiple gear ratios driven by the engine, an electronic controller assembly for controlling both the engine and the transmission, a mode selector actuatable by an operator for inputting to the electronic controller an operator selection between manual speed control mode and automatic speed control mode, and a device for determining a variable during automatic speed control mode and inputting the variable to the electronic controller to control the engine rpm and the transmission gear during automatic speed control mode. The selected vehicle speed is maintained by the electronic controller by automatically up-shifting the transmission and reducing engine speed to maintain a desired vehicle speed and reducing fuel consumption when a load on the vehicle is reduced and down-shifting the transmission and increasing engine speed when a higher load is applied. The variable is (a) the position of a selector switch, which is positionable in a field mode for operating the vehicle in a field, including tillage applications under changing load conditions, and a road mode for operating the vehicle during road hauling or transportation, (b) the position of a brake and ground speed, (c) vehicle slippage and ground speed, (d) an operator set maximum and minimum ground speed, (e) an operator set maximum and minimum gear setting, (f) system sensitivity, and/or (g) change in implement status. The maximum allowable vehicle ground speed and the maximum allowable gear are greater in the road mode than in the field mode.

Another embodiment is a method of managing power of an engine-powered vehicle having an engine with a rated engine speed, a transmission with multiple gear ratios driven by the engine, an electronic controller for controlling both the engine and the transmission, a mode selector that is actuatable by an operator for inputting to the electronic controller an operator selection between manual speed control mode and automatic speed control mode, and a device for determining a variable during automatic speed control mode and inputting the variable to the electronic controller to control the engine rpm and the transmission gear during automatic speed control mode. The selected vehicle speed in automatic mode is maintained by the electronic controller by automatically up-shifting the transmission and reducing engine speed to maintain a desired vehicle speed and reducing fuel consumption in response to a reduction of a load on the vehicle and by automatically down-shifting the transmission and increasing engine speed when a higher load is applied. The method includes determining the variable and inputting the variable to the electronic controller to control the engine rpm and the transmission gear during automatic speed control mode. The variable is (a) the position of a selector switch, which is positionable in a field mode for operating the vehicle in a field, including tillage applications under changing load conditions, and a road mode for operating the vehicle during road hauling or transportation, (b) the position of a brake and ground speed, (c) vehicle slippage and ground speed, (d) an operator set maximum and minimum ground speed, (e) an operator set maximum and minimum gear setting, (f) system sensitivity, and/or (g) change in implement status, wherein the maximum allowable vehicle ground speed and the maximum allowable gear are greater in the road mode than in the field mode.

Certain advantages of the present invention described herein include automatically adjusting the gear setting and engine rpm, so that the engine, and therefore the vehicle, will tend to run in the most efficient mode for a given load. When the external load increases, the engine rpm will increase and produce more power. When the external load decreases, the engine rpm will decrease, consume less fuel, and produce less noise, yielding inherent benefits to the environment.

By measuring one or more variables, the change in load may be anticipated and the efficiency of the automatic power management (APM) system improved. These variables include (a) the position of a selector switch, which is positionable in a field mode for operating the vehicle in a field, including tillage applications under changing load conditions, and a road mode for operating the vehicle during road hauling or transportation, (b) the position of a brake and ground speed, (c) vehicle slippage and ground speed, (d) an operator set maximum and minimum ground speed, (e) an operator set maximum and minimum gear setting, (f) system sensitivity, and/or (g) change in implement status.

A second advantage is simplifying the operation and control of work vehicles by allowing the operator to use one control, the throttle, to set ground speed instead of the typical two controls, throttle and gear button, using a separate speed control lever. This construction makes the vehicle control easier and more convenient, especially when the operator is busy with other operations, such as during headland operations.

Another advantage is that a work vehicle can be retrofitted with the APM system by reprogramming the electronic controllers. Since the throttle is used to control vehicle speed in the automatic speed control mode, as well as erpm in the manual speed control mode, no additional hardware, such as a separate speed lever, is necessary.

The APM system is simple and easy to implement. Engine rpm throttles are common components in most agricultural vehicles. The power shift transmissions are typically controlled by an electronic controller. With the present invention, there is no need to add hardware to the vehicle. The function can be conveniently implemented by a software upgrade.

A further advantage is that it is easier for the operator to control the vehicle. Therefore, there is less chance for confusion, error and accident.

Intended advantages of the disclosed systems and/or methods satisfy one or more of these needs or provide other advantageous features. Other features and advantages will be made apparent from the present specification. The teachings disclosed extend to those embodiments that fall within the scope of the claims, regardless of whether they accomplish one or more of the aforementioned needs.

Alternative exemplary embodiments relate to other features and combinations of features as may be generally recited in the claims.

BRIEF DESCRIPTION OF THE FIGURES

FIG. 1 is a schematic drawing of an automatic power management control system.

DETAILED DESCRIPTION OF THE EXEMPLARY EMBODIMENTS

Automatic power management (APM) mode is an automatic, continuous ground speed operation mode available with a power shift transmission. This mode can be entered by simply pressing an APM switch. Once APM mode is entered, the engine throttle will no longer control the engine rpm. Instead, the throttle becomes the ground speed selector.

The operator can set the desired ground speed by setting the throttle position, with the minimum lever position designating the minimum desired vehicle speed, the maximum lever position designating the maximum desired vehicle speed, and intermediate positions designating other possible speeds in between. Once the desired ground speed is set, the control system will set the gear and erpm for the vehicle. The target speed set by the operator is displayed on a Variable Monitor Unit.

If the vehicle is operating under higher load, the control system will select a lower gear so the power train can accommodate higher loads. The erpm will increase to produce more horsepower. As vehicle load increases, the control system will keep lowering the gear and increasing the erpm to maintain the desired ground speed and accommodate the vehicle load, until the maximum power is reached. When the vehicle is running under lower load, the control system will increase the gear setting and decrease the erpm so the power train will operate in the most efficient manner with the given vehicle load. As vehicle load decreases, the control system will continue to decrease the erpm and increase the gear setting to maintain the desired ground speed and gain more efficiency, until the minimum allowed erpm is reached.

With the control system automatically adjusting the gear setting and engine rpm, the engine, and therefore the vehicle, will always be running near the maximum torque curve, and therefore in the most efficient mode. When the external load increases, gear setting will be decreased and engine speed will be increased to produce more power For ease of calculation, engine load threshold for down-shifting is can be measured either with engine speed reduction or decrease from its set point or torque. If the engine load is beyond the threshold value, the software controls gear down-shifting until first gear is reached or the engine is running near the maximum power state.

When the external load decreases, the engine rpm will decrease, consume less fuel, and produce less noise. If there are enough torque/power reserves to support a higher gear, the software controls gear up-shifting and reducing erpm until the top gear is reached or the engine load is running near the max torque curve.

FIG. 1 shows, schematically, the APM control system of the present invention in a shift up/throttle back automatic, continuous ground speed operation mode. In the automatic speed control mode, an electronic controller 1 controls an electronic engine controller 2 and a power shift transmission 3. The engine controller 2 controls engine operations including erpm. The power shift transmission 3 runs with given transmission gear, and therefore sets the axle speed range.

The vehicle ground speed is determined by the final drive 4, which is dependant on the axle speed and the external load, as well as the circumference of the vehicle tire. Actual vehicle ground speed can also be determined by radar mounted on the bottom of the vehicle, which determines the actual ground speed by measuring the Doppler effect, or by utilizing a GPS system. As shown in FIG. 1, the vehicle ground speed is sent to the electronic controller 1.

The final drive 4 generates an axle torque that must be accommodated by the power shift transmission 3. The power shift transmission 3 drives the axle with the gear selection of the electronic controller 1 and engine speed set by the electronic engine controller 2. The axle torque, through the power shift transmission 3, will establish the engine torque sustained by the engine 6. The engine torque and the real erpm will be measured by the electronic engine controller 2 and the signals will be sent to the electronic controller 1.

The electronic controller 1 controls the electronic engine controller 2 and the power shift transmission 3 based on the engine load (torque or erpm drag) signal from the electronic engine controller 2, the vehicle ground speed signal from the final drive 4 and the desired vehicle ground speed signal inputted by the operator. The operator inputs the desired vehicle ground speed by positioning the throttle when in automatic speed control mode.

The automatic speed control mode can be selected, such as by positioning a toggle switch or pressing a button. Once the automatic speed control mode is selected, the throttle no longer controls erpm, but controls vehicle ground speed. The throttle includes a minimum lever position designating the minimum desired vehicle speed, a maximum lever position designating the maximum desired vehicle speed, and other possible desired speeds in between.

Once the desired ground speed is set, the control system will set the gear and erpm for the vehicle. If the vehicle is running under higher load, the control system will select a lower gear so that the power train can accommodate on higher load. The erpm will increase to produce more horsepower. As the vehicle load increases, the control system will continue lowering the gear and increasing the erpm to maintain the desired ground speed and accommodate the vehicle load, until the maximum power is reached.

When the vehicle is running under a decreased load, the control system will raise the gear setting and decrease the erpm so that the power train will run at the most efficient condition with the vehicle load. As the vehicle load decreases, the control system will continue lowering the erpm and increasing the gear setting to maintain the desired ground speed and increase efficiency, until the minimum allowed erpm or maximum allowed gear is reached.

Therefore, when the vehicle is in the automatic speed control mode, the operator can simply use one control (the throttle) to set and maintain or change ground speed instead of the typical two controls (throttle and gear button) in manual speed control mode. Further, the APM automatically and continuously compensates for changes in load, such as occur when the grade over which the vehicle travels changes, e.g., from uphill to downhill, or when the soil conditions change, e.g., from hard pack to soft.

By monitoring one or more variables with a variable monitor 5 (shown in FIG. 1), the APM system can tailor itself to be more suitable to the working environment and therefore its efficiency improved. In some cases, the change in load may be anticipated. By inputting the variable to the electronic controller 1, the electronic controller 1 can control the engine rpm and the transmission gear adaptive to or even before the load changes. These variables include (a) the position of a selector switch, which is positionable in a field mode for operating the vehicle in a field, including tillage applications under changing load conditions, and a road mode for operating the vehicle during road hauling or transportation, (b) the position of a brake and ground speed, (c) vehicle slippage and ground speed, (d) an operator set maximum and minimum ground speed, (e) an operator set maximum and minimum gear setting, (f) system sensitivity, and/or (g) change in implement status, i.e., whether the implement is about to be engaged or disengaged.

To accommodate different applications, the APM can operate in two constant ground speed (CGS) modes, Constant Ground Speed Roading and Constant Ground Speed Field. The Constant Ground Speed functions may be controlled in one embodiment using an engage/disengage Constant Ground Speed switch. This switch may be a three-position switch, in which one position selects CGS Road operation and a second position selects CGS Field operation.

The operator can press the APM/CGS Road end of a switch, such as a three-position rocker switch to enter APM/CGS Road mode, or can press the APM/CGS Field end of the three-position rocker switch to enter APM/CGS Field mode.

The CGS Field mode is configured to work for field usage. In one embodiment, the CGS Field mode can operate from gear 1 to a higher gear, such as gear 14, with continuous adjustable ground speed. The erpm can typically run from the peak torque erpm to high idle to accommodate large hydraulic demands. Special functions can be added to handle field needs (such as headland turning, implement requirements etc.).

The operator can press the APM/CGS Field end of the rocker switch to enter CGS Field mode. The operator can select the desired ground speed by setting the throttle position. The target speed set by the operator will display on the Variable Monitor Unit. The operator no longer has to manually shift gears up or down. The system will shift gears/engine rpm appropriately based on the vehicle load as needed to maintain the set ground speed.

The CGS Field operation is intended primarily for tillage applications. The operator uses the throttle to adjust the ground speed. The minimum throttle position corresponds to gear 1 at the minimum allowable engine speed. The minimum engine speed is the peak torque engine rpm (1400 erpm for the CNH Magnum tractor and 1500 erpm for the CNH T8000 tractor) when the power take-off (PTO) is not turned on. When the PTO is turned on, the minimum allowable engine speed is 1600 rpm. This minimum engine speed limit is set to prevent engine stall.

The maximum throttle position corresponds to the maximum allowable selected ground speed. The maximum allowable selected ground speed is adjustable, with the default being typically 5 mph. In any mode, if the CGS Field mode selector, such as the end of a rocker switch, is held down for more than a predetermined time duration, such as about 4 seconds, the real ground speed at the end of the predetermined time duration will be stored as the maximum allowable selected ground speed. This maximum allowable selected ground speed value will be retained irrespective whether the tractor ignition key is on or off, until operator changes it. The maximum allowable selected ground speed can also be adjusted through the machine-user interface (not shown).

The maximum allowable selected ground speed cannot exceed a predetermined gear, such as gear 14 at high idle, or about 23 km/h (14.3 mph), for example. If the real ground speed is higher, the gear 14 at high idle will be stored as the maximum allowable selected ground speed, or about 23 km/h (14.3 mph), for example.

The system selects the most efficient gear based on load for the speed set by the operator. The control system then commands the engine rpm to increase or decrease as needed to maintain the desired ground speed.

The CGS Field Operation is suspended (no automatic shifting occurs, but the mode is not exited) when the "inching pedal" is depressed, the transmission control lever is moved out of the FORWARD position, or the operator leaves the tractor seat. In the suspended condition, the erpm will follow the throttle control. The operator can set gears by pushing the up/down-shift button. The tractor can operate in reverse, similar to standard operation mode. When the condition resulting in suspension is removed, CGS shifting resumes. The CGS Field Operation is exited when the APM/CGS switch is pressed or shift button pressed.

The CGS Roading mode is configured to work for road hauling and transportation. The operator can use the throttle to adjust the ground speed in a manner similar to operating a continuously variable transmission (CVT transmission), using the separate speed lever. In one embodiment, the minimum throttle position corresponds to the lowest allowable ground speed, as low as about 1.2 km/h (0.75 mph), for example. The lowest allowable ground speed is the lowest allowable gear at low idle. The lowest allowable gear can be set between gear 1 and a higher gear, such as gear 13, through the machine-user interface (not shown), with the default being 7th gear, for example. The maximum throttle position corresponds to a maximum gear, such as gear 18 or 19, for the example, at high idle.

The system selects the most efficient gear based on load for the speed set by the operator. The software then commands the engine rpm up or down to maintain the desired ground speed.

The CGS Road Operation is suspended (no automatic shifting occurs, but the mode is not exited) when the "inching pedal" is depressed, the transmission control lever is moved out of the FORWARD position, or the operator leaves the tractor seat. In the suspended condition, the erpm will follow the throttle control. The operator can set gear by pushing the up/down-shift button. The tractor can operate in reverse, similar to standard operation mode. When the condition resulting in Auto Road suspension is removed, automatic shifting resumes.

The APM mode in the CGS Road Operation is exited when the APM/CGS switch is pressed or when using creeper gears (if vehicle is equipped) or shift button pressed.

Using the brake to slow down or stop the vehicle is a common and necessary operation in vehicle control. When the brake is applied, the engine load naturally increases. With prior controls, the brake load is not differentiated from normal field load. Therefore, the engine controller 2 would respond by increasing erpm in an attempt to overcome the brake load. This operating response would dramatically reduce the effectiveness of the brake. In severe conditions, the brake could totally lose its effectiveness.

In the present APM, the system will evaluate the brake status and the actual ground speed. Once the brake is applied, the control system will not continue to maintain the desired ground speed, but will control the engine rpm and the gear ratio to be such that the target ground speed is slightly below the actual ground speed. In such case, the engine 6 will not be "fighting against" the brake. Instead, the engine 6 will help braking.

The engine braking effect can be controlled by adjusting the amount of the target ground speed below actual ground speed. For higher engine braking effect, the target ground speed can be controlled to be much lower than the actual ground speed. If less engine braking effect is desired, the target ground speed can be controlled to be closer to the actual ground speed. The engine braking effect is limited by how much back pressure the engine cylinder endure. The engine braking function can be optimized according to the engine characteristics, vehicle braking requirements, and the operator preference. Though less efficient than preferred method of setting the target speed below the actual speed, setting the target speed equal to or slight higher than the actual ground speed is more efficient than the prior controls When tractors are running in the field, the implement load may cause tractor tires to slip against the ground surface. A slight slippage (less than about 6% to about 13% in most cases) can absorb sudden load changes and lower load shocks. This slight slippage protects the vehicle power train and provides the operator smoother rides. A slight slippage is often desirable and inevitable.

However, when the tractor is operating with a heavy load, the slippage will often go much higher than the desired level, especially with wet or sandy or loose dirt surfaces. On such surfaces, the traction limit is much lower than normal field surfaces. Once the implement load exceeds the traction limit of the tires or drive tracks, which happens often in the field, the slippage will easily become uncontrolled. The tires will be spin excessively and quickly dig a hole to partially bury the tractor, causing the tractor to stall.

As the slippage increases, the friction coefficient between the tires and the ground surface will shift from static to dynamic, which in turn will lower the traction limit and decrease the engine load. In such cases, prior controls result in a shift to a higher gear and lower engine rpm. The tires will be running close to the target speed. Once the tires start to "dig" into the ground, the load will suddenly increase. Since the tractor is already running in higher gear and lower engine rpm, it will tend to have a lower torque capacity and the tractor will not be able to propel itself out of the hole.

In the present APM system, a function is to monitor and evaluate the tractor slippage and the tractor ground speed. The APM system also allows the operator to adjust the desired slip level according to the field conditions. Once the slippage goes beyond the set limit, the control system will start to lower the gear. This gear reduction will decrease the tire speed and increase the traction limit. The slippage will therefore be lowered. At the same time, the tractor will be running with higher torque capacity. Therefore, the chance of the tires "digging" into the ground will be less and the tractor can more easily pull itself out of the hole.

The operator may set the maximum and minimum operational gears, and the maximum and minimum operational ground speed limits through the machine-user interface (not shown). The electronic controller 1 of the APM system is configured to retain the operator selected settings. When the control lever is located at one end of the range of movement, i.e., the minimum position, the tractor will run in the minimum gear or at the minimum speed, as designated by the operator. When the control lever is located at the other end of the range of movement, i.e., the maximum position, the tractor will run in the maximum gear or at the maximum speed designated by the operator. Since the operator can set the maximum and minimum desired ground speed and gears for the range of control lever movement, rather than accepting the maximum and minimum allowable ground speed and gears, much finer control resolutions with the same control lever movement range are obtained.

Greater convenience in operations, such as in cultivating operations, is also achieved by being able to set the maximum and minimum desired ground speed and gears for the full range of control lever movement. The operator typically needs two speed settings in such operations, one for running in the field and one for maneuvering at the headland or field end. He can easily set the two speeds as the top and bottom limits. By pushing the control lever to one end of the range, the tractor may run at the field speed. By pulling the lever to the other end of the movement range, the tractor may run at the field end speed. No further adjustments are necessary.

As discussed previously, the present APM system will attempt to operate the vehicle under the most efficient conditions by optimizing the engine rpm and gear ratio according to the vehicle load. If the vehicle load increases, the system will lower the gear and increase the engine rpm. When the load decreases, the control system will lower the erpm and increase the gear setting.

To optimize efficiency, the system needs to respond to the load change and adjust the gear and rpm as quickly as possible. In some applications, the operator will prefer the gear to shift less frequently. Different applications require different system sensitivity. Further, operators have different desires concerning the system performance. Higher sensitivity provides better efficiency but requires more gear and engine rpm changes. Lower sensitivity provides reduced efficiency but provides more stable gear and engine rpm settings.

The present APM system provides an easy means for the operator to adjust the sensitivity. So the system performance can be tailored to the application requirements and operator preferences.

During field operations, most vehicles will not only face load changes from field condition changes, such as slope changes, field hardness changes and rocks, they will also face load changes due to a change in implement status, such as engaging and disengaging a ripper, a plow, a cultivator, a harrow, or a scraper. It relatively easy for a system to compensate with field condition changes. Those changes are more likely to be gradual. The load changes from an implement status change can often be sudden and severe. One example is in field operations when a heavy ripper or plow is quickly lowered to enter the ground. Another example is in scraper operations when a bucket is quickly lowered to cut the ground.

With prior controls, the load changes will more often than not be too sudden and too severe to allow the system to respond. The gear change and engine rpm adjustments will not be quick enough and the tractor will stall.

In the present APM system, implement operation status will be monitored. The system can adjust the gear and engine rpm when such status changes are detected and before the real load changes, such as when the system detects that the ripper or the bucket is lowered. The APM system will start the down-shift and raise the engine rpm before the ripper or bucket enters the ground, and the tractor will be ready to accommodate a higher load. When load does increase, it will not stall the tractor. When the implement is raised from the ground, the system can response accordingly to gain efficiency.

It should be understood that the application is not limited to the details or methodology set forth in the following description or illustrated in the figure. It should also be understood that the phraseology and terminology employed herein is for the purpose of description only and should not be regarded as limiting.

While the exemplary embodiments illustrated in the figure and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

It is important to note that the construction and arrangement of the automatic power management control system, as shown in the various exemplary embodiments, is illustrative only. Although only a few embodiments have been described in detail in this disclosure, those who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application.

The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

The invention claimed is:

1. An engine-powered vehicle having an automatic power management feature comprising:
    an engine having a set of built-in torque curves;
    a transmission with multiple gear ratios driven by the engine;
    a final drive configured to provide axle torque data to the transmission to establish engine torque sustained by the engine and to provide power for an external load; and
    an electronic controller for controlling both the engine and the transmission, the electronic controller having automatic speed control, and the electronic controller including a device configured to input data and receive data from the electronic controller and to evaluate at least one variable during automatic speed control mode;
    wherein the electronic controller receives data input from the engine, from the transmission, from the final drive, and from the device, and the electronic controller determines engine rpm and transmission gear as a result of the data received to maintain a selected vehicle speed by automatically up-shifting the transmission and reducing engine speed to reduce fuel consumption when a load on the vehicle is reduced and down-shifting the transmission and increasing engine speed when the load is applied,
    wherein the variable includes at least one of (a) a position of a selector switch, the selector switch being positionable in a field mode for operating the vehicle in a field, including tillage applications under changing load conditions, and a road mode for operating the vehicle during road hauling or transportation, (b) a position of a brake, (c) vehicle ground speed, (d) vehicle ground speed slippage, (e) an operator set maximum and minimum ground speed, (f) an operator set maximum and minimum gear setting, (g) system sensitivity, and (h) change in implement status.

2. The vehicle of claim 1, wherein the device is configured to evaluate the position of the selector switch and wherein the maximum allowable selected vehicle ground speed in the field mode is less than the maximum allowable selected vehicle ground speed in the road mode.

3. The vehicle of claim 1, wherein the device is configured to evaluate the position of the selector switch and wherein the maximum allowable selected vehicle ground speed in the field mode is adjustable.

4. The vehicle of claim 1, wherein the device is configured to evaluate the position of the brake and the vehicle ground speed and wherein the electronic controller is configured to set a target vehicle ground speed less than an actual vehicle ground speed.

5. The vehicle of claim 1, wherein the device is configured to evaluate the position of the brake and the vehicle ground speed and wherein the electronic controller is configured to set a target vehicle ground speed equal to or slight higher than an actual vehicle ground speed.

6. The vehicle of claim 1, wherein the device is configured to evaluate the vehicle ground speed and the vehicle ground speed slippage, and wherein the electronic controller is configured to lower a selected gear when the vehicle ground speed slippage exceeds a predetermined value.

7. The vehicle of claim 1, wherein the device is configured to evaluate the operator set maximum and minimum ground speed or the operator set maximum and minimum gear setting, and wherein the set maximum ground speed or set maximum gear setting corresponds to a control lever being at one end of a control lever movement range and the set minimum ground speed or set minimum gear setting corresponds to the control lever being at an opposite end of the control lever movement range.

8. The vehicle of claim 1, wherein the device is configured to evaluate system sensitivity and wherein the electronic controller is configured to increase the system sensitivity for better efficiency or decrease the system sensitivity to provide more stable gear and engine rpm settings.

9. The vehicle of claim 1, wherein the device is configured to evaluate change in implement status and wherein the electronic controller is configured to anticipate load changes resulting from a change in status of the implement by adjusting the gear and engine rpm before the change in the implement status changes the load.

10. The vehicle of claim 1, wherein the transmission is a variable transmission.

11. The vehicle of claim 1, wherein the device includes a monitor.

12. The vehicle of claim 1, wherein the device evaluates at least two variables.

13. A method of managing power of an engine-powered vehicle having an engine with a set of built-in torque curves, a transmission with multiple gear ratios driven by the engine, a final drive configured to provide axle torque data to the transmission to establish engine torque sustained by the engine and to provide power for an external load, an electronic controller for controlling both the engine and the transmission, the electronic controller having automatic speed control, and the electronic controller including a device configured to input data and receive data from the electronic controller and to evaluate at least one variable during automatic speed control mode, the device inputting data from the variable to the electronic controller, the method comprising:
automatically
inputting data from the engine to the electronic controller;
inputting data from the final drive to the transmission and to the electronic controller;
inputting data from the transmission to the electronic controller;
inputting data from the at least one variable from the device to the electronic controller and receiving data from the electronic controller;
evaluating the data received by the electronic controller from the engine, the transmission, the final drive, and the device to determine engine rpm and transmission gear, and
issuing commands from the electronic controller to the engine and the transmission as a result of evaluating the data to control engine rpm and transmission gear so that a selected vehicle speed in the automatic speed control mode is maintained by the electronic controller by automatically up-shifting the transmission and reducing engine speed to maintain a desired vehicle speed and reducing fuel consumption in response to a reduction of a load on the vehicle reduced and by automatically down-shifting the transmission and increasing engine speed when the load is applied,
wherein the variable includes at least one of
(a) a position of a selector switch, the selector switch being positionable in a field mode for operating the vehicle in a field, including tillage applications under changing load conditions, and a road mode for operating the vehicle during road hauling or transportation, (b) a position of a brake, (c) vehicle ground speed, (d) vehicle ground speed slippage, (e) an operator set maximum and minimum ground speed, (f) an operator set maximum and minimum gear setting, (g) system sensitivity, and (h) change in implement status.

14. The method of claim 13, wherein the position of the selector switch is evaluated and wherein the maximum allowable selected vehicle ground speed in the field mode is controlled to be less than the maximum allowable selected vehicle ground speed in the road mode.

15. The method of claim 13, wherein the position of the selector switch is evaluated and wherein the maximum allowable selected vehicle ground speed in the field mode is adjusted.

16. The method of claim 13, wherein the position of the brake and the vehicle ground speed are evaluated and wherein the electronic controller sets a target vehicle ground speed to be less than an actual vehicle ground speed.

17. The method of claim 13, wherein the position of the brake and the vehicle ground speed are evaluated and wherein the electronic controller sets a target vehicle ground speed to be equal to or slight higher than an actual vehicle ground speed.

18. The method of claim 13, wherein the vehicle ground speed slippage and the vehicle ground speed are evaluated and wherein the electronic controller lowers a selected gear when the vehicle ground speed slippage exceeds a predetermined value.

19. The method of claim 13, wherein the operator set maximum and minimum ground speed or the operator set maximum and minimum gear setting are evaluated, and wherein the electronic controller sets maximum ground speed or sets maximum gear setting when a control lever is positioned at one end of a control lever movement range and the electronic controller sets minimum ground speed or sets minimum gear setting when the control lever is positioned at an opposite end of the control lever movement range.

20. The method of claim 13, wherein the system sensitivity is evaluated and wherein the system sensitivity is increased for better efficiency or the system sensitivity is decreased to provide more stable gear and engine rpm settings.

21. The method of claim 13, wherein the change in implement status is evaluated and wherein the electronic controller anticipates load changes resulting from a change in status of the implement by adjusting the gear and engine rpm before the change in the implement status changes the load.

22. The method of claim 13, wherein the transmission is a variable transmission.

23. The method of claim 13, wherein the device includes a monitor.

24. The method of claim 13, wherein the device evaluates at least two variables.

25. An engine-powered vehicle having an automatic power management feature comprising:

an engine;

a transmission with multiple gear ratios driven by the engine;

a final drive configured to provide axle torque data to the transmission to establish engine torque sustained by the engine; and an electronic controller for controlling both the engine and the transmission, the electronic controller having automatic speed control, and the electronic controller including a device configured to input data and receive data from the electronic controller and to evaluate at least one variable during automatic speed control mode;

wherein the electronic controller receives data input from the engine, from the transmission, from the final drive, and from the device, and the electronic controller determines engine rpm and transmission gear as a result of the data received to maintain a selected vehicle speed by automatically up-shifting the transmission and reducing engine speed to reduce fuel consumption when a load on the vehicle is reduced and down-shifting the transmission and increasing engine speed when the load is applied, wherein the variable includes at least one of (a) a position of a selector switch, the selector switch being positionable in a field mode for operating the vehicle in a field, including tillage applications under changing load conditions, and a road mode for operating the vehicle during road hauling or transportation, (b) a position of a brake, (c) vehicle ground speed, (d) vehicle ground speed slippage, (e) an operator set maximum and minimum ground speed, (f) an operator set maximum and minimum gear setting,(g) system sensitivity, and (h) change in implement status.

26. The vehicle of claim 25, wherein the device is configured to evaluate the position of the selector switch and wherein the maximum allowable selected vehicle ground speed in the field mode is less than the maximum allowable selected vehicle ground speed in the road mode.

27. The vehicle of claim 25, wherein the device is configured to evaluate the position of the selector switch and wherein the maximum allowable selected vehicle ground speed in the field mode is adjustable.

28. The vehicle of claim 25, wherein the device is configured to evaluate the position of the brake and the vehicle ground speed and wherein the electronic controller is configured to set a target vehicle ground speed less than an actual vehicle ground speed.

29. The vehicle of claim 25, wherein the device is configured to evaluate the position of the brake and the vehicle ground speed and wherein the electronic controller is configured to set a target vehicle ground speed equal to or slight higher than an actual vehicle ground speed.

30. The vehicle of claim 25, wherein the device is configured to evaluate the vehicle ground speed and the vehicle ground speed slippage, and wherein the electronic controller is configured to lower a selected gear when the vehicle ground speed slippage exceeds a predetermined value.

31. The vehicle of claim 25, wherein the device is configured to evaluate the operator set maximum and minimum ground speed or the operator set maximum and minimum gear setting, and wherein the set maximum ground speed or set maximum gear setting corresponds to a control lever being at one end of the control lever movement range and the set minimum ground speed or set minimum gear setting corresponds to a control lever being at an opposite end of the control lever movement range.

32. The vehicle of claim 25, wherein the device is configured to evaluate system sensitivity and wherein the electronic controller is configured to increase system sensitivity for better efficiency or decrease system sensitivity to provide more stable gear and engine rpm settings.

33. The vehicle of claim 25, wherein the device is configured to evaluate change in implement status and wherein the electronic controller is configured to anticipate load changes resulting from a change in status of the implement by adjusting the gear and engine rpm before the change in the implement status changes the load.

34. The vehicle of claim 25, wherein the transmission is a variable transmission.

35. The vehicle of claim 25, wherein the device includes a monitor.

36. The vehicle of claim 25, wherein the device evaluates at least two variables.

* * * * *